US011435176B2

(12) United States Patent
Rogers et al.

(10) Patent No.: US 11,435,176 B2
(45) Date of Patent: Sep. 6, 2022

(54) SYSTEMS AND METHODS FOR REMOTE SENSING OF AIR GAPS USING A CAPACITOR SENSOR ARRAY

(71) Applicant: THE BOEING COMPANY, Chicago, IL (US)

(72) Inventors: John E. Rogers, Owens Cross Roads, AL (US); Ted Ronald Dabrowski, Madison, AL (US); Robert A. Smith, Hampton Cove, AL (US); Timothy Doyle Messer, Madison, AL (US); Corey McKinney Thacker, Madison, AL (US); Michael Francis Mitchell, Huntsville, AL (US)

(73) Assignee: The Boeing Company, Chicago, IL (US)

( * ) Notice: Subject to any disclaimer, the term of this patent is extended or adjusted under 35 U.S.C. 154(b) by 66 days.

(21) Appl. No.: 16/365,028

(22) Filed: Mar. 26, 2019

(65) Prior Publication Data
US 2020/0309504 A1  Oct. 1, 2020

(51) Int. Cl.
*G01B 7/14*  (2006.01)
(52) U.S. Cl.
CPC ............ *G01B 7/14* (2013.01); *G01B 2210/58* (2013.01)
(58) Field of Classification Search
CPC . B23K 20/00; C25D 5/00; G01B 7/00; G01B 7/14; G01B 2210/58; G01D 5/00; G01K 3/00; G01Q 60/00; G01R 1/00; G01R 3/00; G01R 27/00; G01R 29/00; G01R 31/00; G01R 35/00; G06F 17/00; G07C 9/00; H01F 17/00; H01F 27/00; H01F 2017/00; H01F 2021/00; H01L 22/00; H01L 23/00; H01L 24/00; H01L 25/00; H01L 27/00; H01L 29/00; H01L 2223/00; H01L 2224/00; H01L 2924/00; H01R 9/00; H01R 12/00; H02M 1/00; H02M 3/00;

(Continued)

(56) References Cited

U.S. PATENT DOCUMENTS 6,951,139 B2    10/2005  Reuter et al.
7,038,470 B1 *   5/2006  Johnson ............... G01N 27/226
                                                   250/390.05
(Continued)

OTHER PUBLICATIONS

Fonseca, Michael A., Mark G. Allen, Jason Kroh, and Jason White. "Flexible wireless passive pressure sensors for biomedical applications." In Tech. Dig. Solid-State Sensor, Actuator, and Microsystems Workshop (Hilton Head 2006), No. 1, pp. 37-42. 2006.

(Continued)

*Primary Examiner* — Lee E Rodak
*Assistant Examiner* — Joseph O Nyamogo
(74) *Attorney, Agent, or Firm* — Armstrong Teasdale LLP

(57) ABSTRACT

A system for remote sensing of air gaps includes a substrate and a capacitor sensor array attached to the substrate, where the capacitor sensor array includes a plurality of capacitor sensors. The system also includes a transmit antenna attached to the substrate, and a microprocessor electrically connected to the transmit antenna and the capacitor sensor array. The microprocessor is configured to switch on and off at least one capacitor sensor of the plurality of capacitor sensors and to transmit determined air gap measurements using the transmit antenna.

20 Claims, 5 Drawing Sheets

(58) Field of Classification Search
CPC ............... H02M 7/00; H02M 2001/00; H02M 2003/00; H02P 5/00; H03B 5/00; H03D 3/00; H03D 7/00; H03F 1/00; H03F 3/00; H03F 2200/00; H03F 2203/00; H03G 1/00; H03G 3/00; H03H 7/00; H03H 11/00; H03H 19/00; H03J 1/00; H03J 3/00; H03J 2200/00; H03K 17/00; H05K 3/00; H05K 1/00; H05K 7/00; H05K 2201/00; H03L 7/00; H03L 2207/00; H04L 27/00; H04R 3/00; H04R 29/00; Y02B 70/00; Y02P 70/00; Y10T 29/00; Y10T 307/00

See application file for complete search history.

(56) References Cited

U.S. PATENT DOCUMENTS

| | | | |
|---|---|---|---|
| 7,421,321 | B2 | 9/2008 | Breed et al. |
| 7,893,697 | B2* | 2/2011 | Ramsey ............... G01B 7/023 324/662 |
| 8,748,999 | B2 | 6/2014 | Chou et al. |
| 9,292,091 | B1 | 3/2016 | Grivna et al. |
| 9,338,825 | B2 | 5/2016 | Bulgajewski et al. |
| 9,582,981 | B2 | 2/2017 | Rokhsaz et al. |
| 10,024,738 | B2 | 7/2018 | Conti et al. |
| 10,069,205 | B2 | 9/2018 | Rokhsaz et al. |
| 2005/0192727 | A1 | 9/2005 | Shostak et al. |
| 2006/0213278 | A1* | 9/2006 | Arms ..................... G01B 7/16 73/781 |
| 2012/0319706 | A1* | 12/2012 | Nadel .................... G01N 27/22 324/679 |
| 2015/0260835 | A1 | 9/2015 | Widmer et al. |
| 2018/0014747 | A1* | 1/2018 | Akselrod ............... A61B 90/98 |

OTHER PUBLICATIONS

Estefania, A., Stefano, Z., Santiago, M., Andrea, S., Barbara, M., Aritz, J., David, G., Ivan, E., Cardinali, G.C., Gómez, J.M. and Francisco, P., 2007. Flexible tag Microlab development: gas sensors integration in RFID flexible tags for food logistics. Sensors and Actuators B, Chemical, 127, pp. 2-7.

Rida, A., Yang, L., Vyas, R. and Tentzeris, M.M., 2009. Conductive inkjet-printed antennas on flexible low-cost paper-based substrates for RFID and WSN applications. IEEE Antennas and Propagation Magazine, 51(3).

Rose, D.P., Ratterman, M.E., Griffin, D.K., Hou, L., Kelley-Loughnane, N., Naik, R.R., Hagen, J.A., Papautsky, I. and Heikenfeld, J.C., 2015. Adhesive RFID sensor patch for monitoring of sweat electrolytes. IEEE Transactions on Biomedical Engineering, 62(6), pp. 1457-1465.

Bito, J., Hester, J.G. and Tentzeris, M.M., 2015. Ambient RF energy harvesting from a two-way talk radio for flexible wearable wireless sensor devices utilizing inkjet printing technologies. IEEE Transactions on Microwave Theory and Techniques, 63(12), pp. 4533-4543.

Escobedo, P., Erenas, M.M., Lopez-Ruiz, N., Carvajal, M.A., Gonzalez-Chocano, S., de Orbe-Paya, I., Capitan-Valley, L.F., Palma, A.J. and Martinez-Olmos, A., 2017. Flexible passive near field communication tag for multigas sensing. Analytical chemistry, 89(3), pp. 1697-1703.

Xu et al., "Passive and wireless near field communication tag sensors for biochemical sensing with smartphone." Sensors and Actuators B: Chemical 246 (2017): 748-755.

* cited by examiner

SYSTEMS AND METHODS FOR REMOTE SENSING OF AIR GAPS USING A CAPACITOR SENSOR ARRAY

FIELD

The field of the disclosure relates generally to remote sensing of air gaps, and more particularly to remote sensing of air gaps using a capacitor sensor array mounted on a flexible substrate.

BACKGROUND

A variety of mechanical structures, such as airframe structures, are manufactured by machining one or more parts individually and subsequently assembling the parts to complete assembly of the greater airframe structure. Although the parts of such a fully assembled structure may fit closely together, in at least some cases, a small gap or void may nevertheless remain between two or more such parts. Traditionally, a "shim," such as, for example, a thin layer of material, may be manufactured and introduced in the void or gap to close and fill the gap.

To manufacture a shim, at least some known systems utilize one or more mechanical gauges to measure one or more gap distances between two or more component parts. These gap distances may be compiled or otherwise aggregated to generate a gap profile that may be provided to a production tool (e.g., a computer numeric control or "CNC" machine) arranged to cut the shim based upon the gap profile. Other systems may employ a variety of electrical gap measurement techniques.

However, in some cases, gap measurements may be difficult, if not impossible, to obtain when parts are already very closely aligned. For instance, many existing systems may require substantial manual labor, such as, for example, in the placement of one or more measurement devices between closely aligned parts and/or in the collection and recordation of one or more gap measurements. In addition, many existing measurement systems may not permit electrical transmission of one or more gap measurements to a receiving system or production tool.

This Background section is intended to introduce the reader to various aspects of art that may be related to the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF DESCRIPTION

In one aspect, a system for remote sensing of air gaps is provided. The system includes a substrate and a capacitor sensor array attached to the substrate, where the capacitor sensor array includes a plurality of capacitor sensors. The system also includes a transmit antenna attached to the substrate, and a microprocessor electrically connected to the transmit antenna and the capacitor sensor array. The microprocessor is configured to switch on and off at least one capacitor sensor of the plurality of capacitor sensors and to transmit determined air gap measurements using the transmit antenna.

In another aspect, a system for remote sensing of air gaps is provided. The system includes a substrate, a signal generator attached to the substrate, and a capacitor sensor array attached to the substrate, where the capacitor sensor array includes a plurality of capacitor sensors. The system also includes a reference capacitor attached to the substrate and electrically connected between the signal generator and the capacitor sensor array. In addition, the system includes a plurality of switching elements attached to the substrate, where at least one switching element of the plurality of switching elements is electrically connected to a respective capacitor sensor of the plurality of capacitor sensors.

In yet another aspect, a method for remote sensing of air gaps is provided. The method includes selecting, by a microprocessor attached to a substrate, a capacitor sensor from an array of capacitor sensors attached to the substrate, and determining, by the microprocessor, a gap distance between the selected capacitor sensor and a conductive ground plane mounted proximate the selected capacitor sensor and spaced apart from the selected capacitor sensor by the gap distance. The method also includes controlling, by the microprocessor, a transmit antenna attached to the substrate to transmit the determined gap distance to a receive subsystem.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated embodiments may be incorporated into any of the above-described aspects, alone or in any combination.

Although specific features of various embodiments may be shown in some drawings and not in others, this is for convenience only. Any feature of any drawing may be referenced and/or claimed in combination with any feature of any other drawing.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

Embodiments of the systems described herein include a sensing and transmit subsystem and a receive subsystem. In at least one example embodiment, the sensing and transmit subsystem includes, among other components, a signal processor system, a transmit antenna, and a capacitor sensor array having a plurality of capacitor sensors. Likewise, the receive subsystem includes a receive antenna and another signal processor system.

During operation, at least a portion of the sensing and transmit subsystem is mounted within an air gap between two component parts of a larger mechanical structure, and the signal processor system of the sensing and transmit subsystem controls the capacitor sensor array to measure one or more gap distances of the air gap. The signal processor system of the sensing and transmit subsystem also controls the transmit antenna to transmit one or more air gap measurements to the receive antenna of the receive subsystem, whereupon the receive subsystem processes the received air gap measurements to control a production tool to manufacture a shim sized to fit within and fill the air gap.

Figure 1:
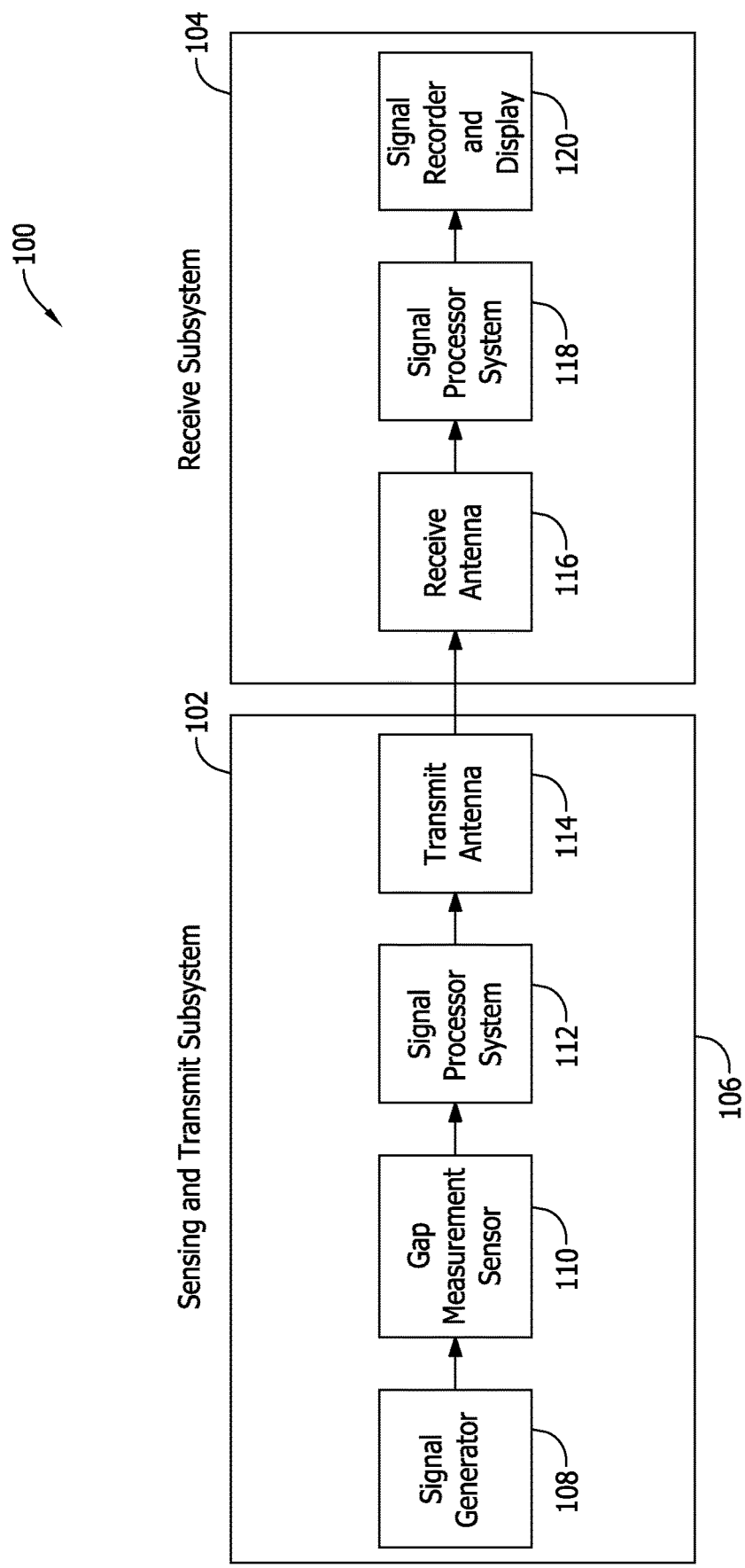
FIG. 1 is a block diagram of an example system for remote sensing of air gaps.

FIG. 1 is a block diagram of an example system 100 for remote sensing of air gaps. Technical effects of system 100 may include, for example: (a) enabling remote sensing of air gaps between one or more component parts of a mechanical structure; (b) enabling construction of an air gap profile based upon data collected by one or more sensors of a capacitor sensor array; (c) reducing time and manual labor required for collection of air gap measurements; (d) transmission of air gap measurements to a receive subsystem and/or production tool; (e) fine and/or detailed measurement of air gaps between closely spaced component parts; and (f) inductive powering of system 100 by a receive subsystem including, for example, a radio-frequency identification (RFID) reader.

In an example embodiment, system 100 includes a sensing and transmit subsystem 102 (or sensing and transmit "side") and a receive subsystem 104 (or receive "side"). Sensing and transmit subsystem 102 may, in turn, include a substrate 106, a signal generator 108, a gap measurement sensor 110, a signal processor system 112, and/or a transmit antenna 114.

In at least some embodiments, substrate 106 may include any flexible substrate capable of supporting a flexible printed circuit, such as a flexible printed circuit including signal generator 108, gap measurement sensor 110, signal processor system 112, and/or transmit antenna 114. In some embodiments, substrate 106 includes a flexible hybrid electronic (FHE) substrate, such as, for example, any polyimide film. One suitable polyimide film substrate may include KAPTON, which may be suitable, as described herein, for supporting a printed circuit.

Further, in at least some embodiments, substrate 106 may include an adhesive coating on a non-printed side, such as, for example, an adhesive coating that facilitates removably mounting substrate 106 on a surface of a component part, as described herein. Substrate 106 enables at least a portion of subsystem 102 to be flexibly inserted in an air gap between structural components to measure, as described herein, a gap distance of the air gap (or "air gap measurements").

Signal generator 108 (or oscillator) may include any analog signal generator, such as, for example, any alternating current (AC) signal generator and/or any other signal generator capable of generating a time-varying periodic waveform (e.g., a sinusoidal or square waveform). Signal generator 108, when implemented, enables remote sensing of air gaps between one or more component parts of a mechanical structure as well as construction of an air gap profile based upon data collected by gap measurement sensor 110. Specifically, signal generator 108 may provide a periodic waveform to portions of sensing and transmit subsystem 102 to enable remote sensing of air gaps.

As described in greater detail below (see FIGS. 2 and 3), air gap measurement sensor 110 may include a capacitor sensor array that includes one or more capacitor sensors. Air gap measurement sensor 110 may be mounted on, fabricated on, printed on, or otherwise attached to substrate 106. As described herein, some technical effects of air gap measurement sensor 110 may include enabling remote sensing or measurement of air gaps between one or more component parts of a mechanical structure and enabling construction of an air gap profile based upon data (e.g., one or more air gap measurements or gap distances) collected by one or more sensors of a capacitor sensor array.

Signal processor system 112 may include any suitable signal processing unit, such as, for example, any computing microprocessor or microcontroller, which may be available as a commercial off the shelf (COTS) component. As used herein, signal processor system 112 may therefore also simply be referred to as a "microprocessor," or "transmit microprocessor," although in some embodiments, signal processor system 112 may be inclusive of other hardware, such as, for example, a computer memory, an oscillator, a voltage regulator, and/or an analog to digital converter (ADC). In some embodiments, signal processor system 112 includes an integrated circuit package, such as, for example, any suitable surface mount or flat no-leads (FN) integrated circuit package. In at least one embodiment, single processor system 112 includes a quad flat no-leads (QFN) integrated circuit package.

One technical effect of signal processor system 112 is that a surface mount integrated circuit package, such as a QFN package, is capable of being mounted on a flexible substrate, such as substrate 106. Another technical effect is that signal processor system 112 is small (e.g., 4 mm×4 mm×0.5 mm) and is capable of being placed in close proximity to the gap measurement sensor 110.

Transmit antenna 114 may include any suitable low power near-field antenna that is capable of transmitting a radio-frequency (RF) and/or another near field communications (NFC) signal to receive subsystem 104. In at least some embodiments, transmit antenna 114 may include any inductive coil capable of modulating a voltage and wirelessly communicating in a range of, for example, 10 mm to 100 cm. Generally speaking, the working distance of an inductive coil may include approximately 10 times the diameter of the inductive coil.

In some embodiments, transmit antenna 114 may be inductively coupled to receive antenna 116 of receive subsystem 104, such that a signal may be sent from receive antenna 116 to transmit antenna 114 and provided to sensing and transmit subsystem 102 to provide electrical power to sensing and transmit subsystem 102. Accordingly, in at least some embodiments, transmit antenna 114 be capable of powering sensing and transmit subsystem 102.

Receive subsystem 104 includes a receive antenna 116, a signal processor system 118, and/or a signal recorder and display system 120. In some embodiments, receive subsystem 104 may include an RF device, such as a radio-frequency identification (RFID) reader and/or any other system capable of wirelessly communicating with sensing and transmit subsystem 102. As described herein, technical effects of receive subsystem 104 include powering sensing and transmit subsystem 102 by inductively coupling with sensing and transmit subsystem 102 and processing, displaying, and/or recording air gap measurements sent from sensing and transmit subsystem 102.

In an example embodiment, receive antenna 116 includes any suitable low power near-field antenna that is capable of transmitting a RF and/or another NFC signal to transmit antenna 114. In at least some embodiments, receive antenna 116 may include any inductive coil capable of modulating a voltage and wirelessly communicating in a range of, for example, 10 mm to 100 cm. Accordingly, one technical effect of receive antenna 116 is that receive antenna 116 may inductively couple to transmit antenna 114 to supply electrical power, via transmit antenna 114, to sensing and transmit subsystem 102.

Signal processor system 118 may include any suitable signal processing unit, such as, for example, any computing microprocessor or microcontroller, which may be available as a COTS component. In at least some embodiments, signal processor system 118 includes, for example, any microprocessor installed or capable of installation in and controlling a computing device, such as in an RFID reader, a smartphone, a tablet computing device, a personal computing device, and the like. As used herein, signal processor system 118 may therefore also simply be referred to as a "microprocessor" or "receive microprocessor," although in some embodiments, signal processor system 118 may be inclusive of other hardware, such as, for example, a computer memory.

Signal processor system 118 enables determination and/or computer model construction of a detailed gap profile of an air gap between component parts. Signal processor system 118 further enables transmission of an air gap profile to a production tool, such as a CNC machine for cutting or manufacture of a shim to fit an air gap corresponding to the air gap profile.

Signal recorder and display system 120 may likewise include any suitable computing and/or computer memory and display device, such as, for example, any tangible, non-transitory, computer-readable memory and/or any computer display. In some embodiments, signal recorder and display system 120 is a memory and display of an RFID reader, a smartphone, a tablet computing device, a personal computing device, and the like. One technical effect of signal recorder and display system 120 includes storage and display of a detailed gap profile of an air gap between component parts.

Figure 2:
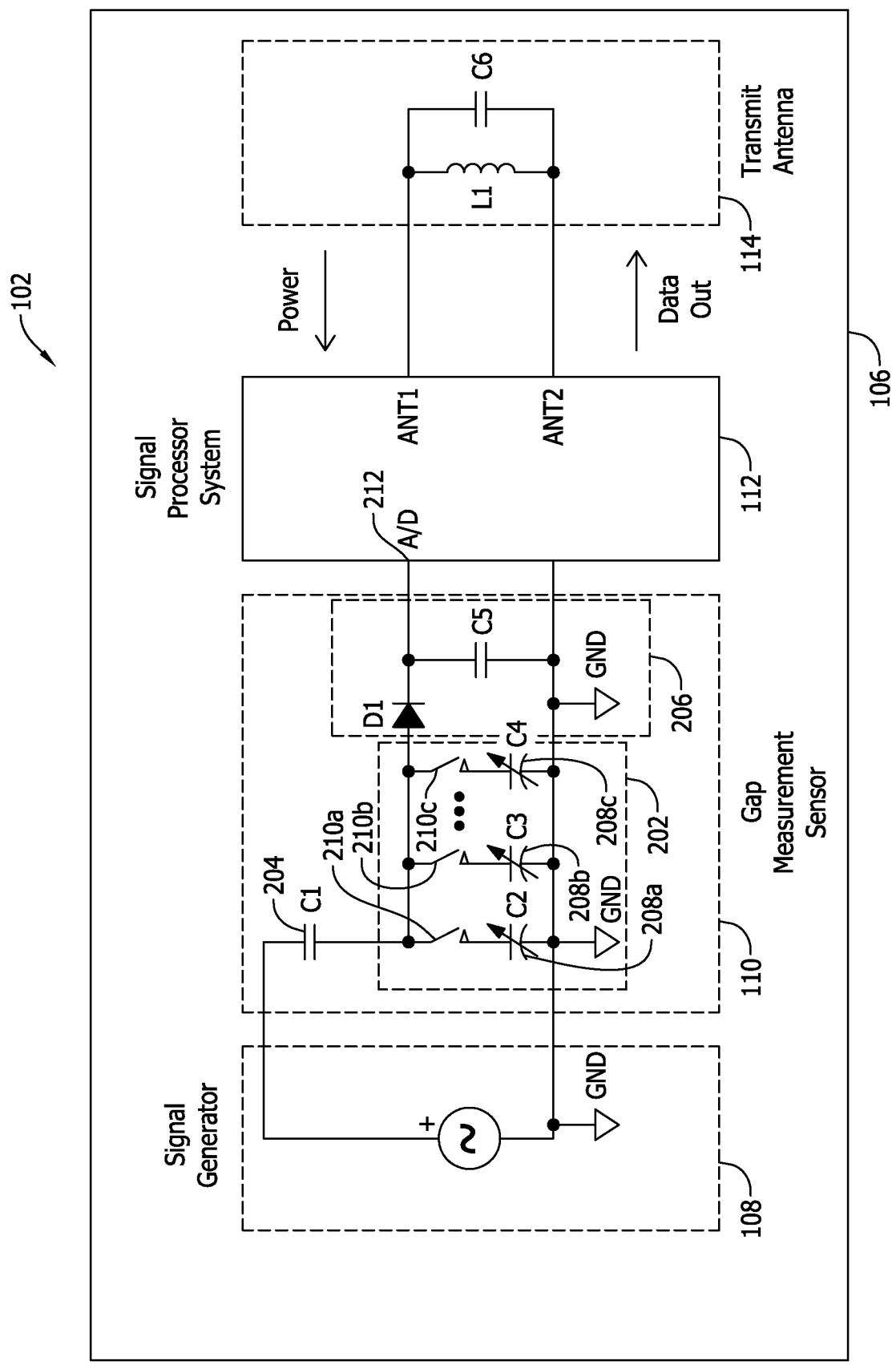
FIG. 2 is a circuit diagram of an example sensing and transmit subsystem of the system shown in FIG. 1.

FIG. 2 is a circuit diagram of sensing and transmit subsystem 102 (shown in FIG. 1). As shown, sensing and transmit subsystem 102 includes signal generator 108 electrically connected to and capable of providing an analog waveform to gap measurement sensor 110 and/or signal processor system 112. Gap measurement sensor 110 is also electrically connected to signal processor system 112, which is, in turn, electrically connected to transmit antenna 114.

As described herein, technical effects of sensing and transmit subsystem 102 may include remote sensing of air gaps between one or more component parts of a mechanical structure, reducing time and manual labor required for collection of air gap measurements, and/or fine and/or detailed measurement of air gaps between closely spaced component parts.

In the example embodiment, gap measurement sensor 110 includes a capacitor sensor array 202, a reference capacitor 204, and a rectifier circuit 206. As shown, capacitor sensor array 202 includes a plurality of capacitor sensors, such as, for example, capacitor sensors 208a-208c. Although three capacitor sensors 208a-208c are indicated at FIG. 2, it will be appreciated that any suitable number of capacitor sensors (such as in the range of one to several hundred) capacitor sensors may be included in capacitor sensor array 202. As described herein, each capacitor sensor 208a-208c is electrically connected to signal processor system 112.

Reference capacitor 204 may include any suitable fixed capacitance capacitor, which may, in at least some embodiments, be selected during manufacturing based upon a gap distance to be measured. For example, if it is anticipated that a gap distance in the range of several millimeters will be measured, reference capacitor 204 may be selected to facilitate measurement, as described herein, of a gap distance in that range.

Moreover, in some embodiments, reference capacitor 204 may include a tunable or adjustable capacitance. If reference capacitor 204 includes a tunable capacitance, reference capacitor 204 may, for example, be manually tunable, such as by rotation of a tuning element, based upon a size of an air gap to be measured. One technical effect of reference capacitor 204 is that reference capacitor 204 facilitates gap distance measurement and may be selected or manually adjusted (i.e., "tuned") to facilitate accurate air gap measurements.

Each capacitor sensor 208a-208c may include a conductive sheet, such as a thin layer of conductive material (e.g., aluminum or copper) that may be electrically connected in parallel, such as through reference capacitor 204, to signal generator 108. As described herein, capacitor sensors 208a-208c may also be individually electrically connected to signal processor system 112. In addition, each capacitor sensor 208a-208c may be of a single predetermined size (or area) and/or capacitor sensors 208a-208c may be of varying sizes (or areas).

Technical effects of capacitor sensors 208a-208c may include measurement and collection of one or more gap measurements and/or calibrating (or "tuning") capacitor sensor array 202 to a particular gap distance by selection, as described herein, of one or more capacitor sensors 208a-208c of a particular size (e.g., a size suitable to a gap distance to be measured).

Moreover, a plurality of electrical switching elements 210a-210c (or "switches") may be electrically connected between each capacitor sensor 208a-208c, respectively, and signal processor system 112. Switching elements 210a-210c may include any suitable switching element, such as, for example, a metal oxide semiconductor field effect transistor (MOSFET) or a bipolar junction transistor (BJT). One technical effect of switches 210a-210c is that switches 210a-210c permit selection, as described herein, of one or more capacitor sensors 208a-208c to facilitate measurement and collection of one or more gap measurements.

Further, in the example embodiment, rectifier circuit 206 may be electrically connected between capacitor sensor array 202 and signal processor system 112. Specifically, an output of rectifier circuit 206 may be provided to an analog input pin 212 of signal processor system 112, where the output may be further converted from analog to digital by signal processor system 112 (e.g., signal processor system 112 may include an ADC or functionality for performing analog to digital conversion). One technical effect of rectifier circuit 206 is that rectifier circuit facilitates measurement and collection of air gap measurements when rectifier circuit 206 is operated with sensing and transmit subsystem 102.

Figure 3:
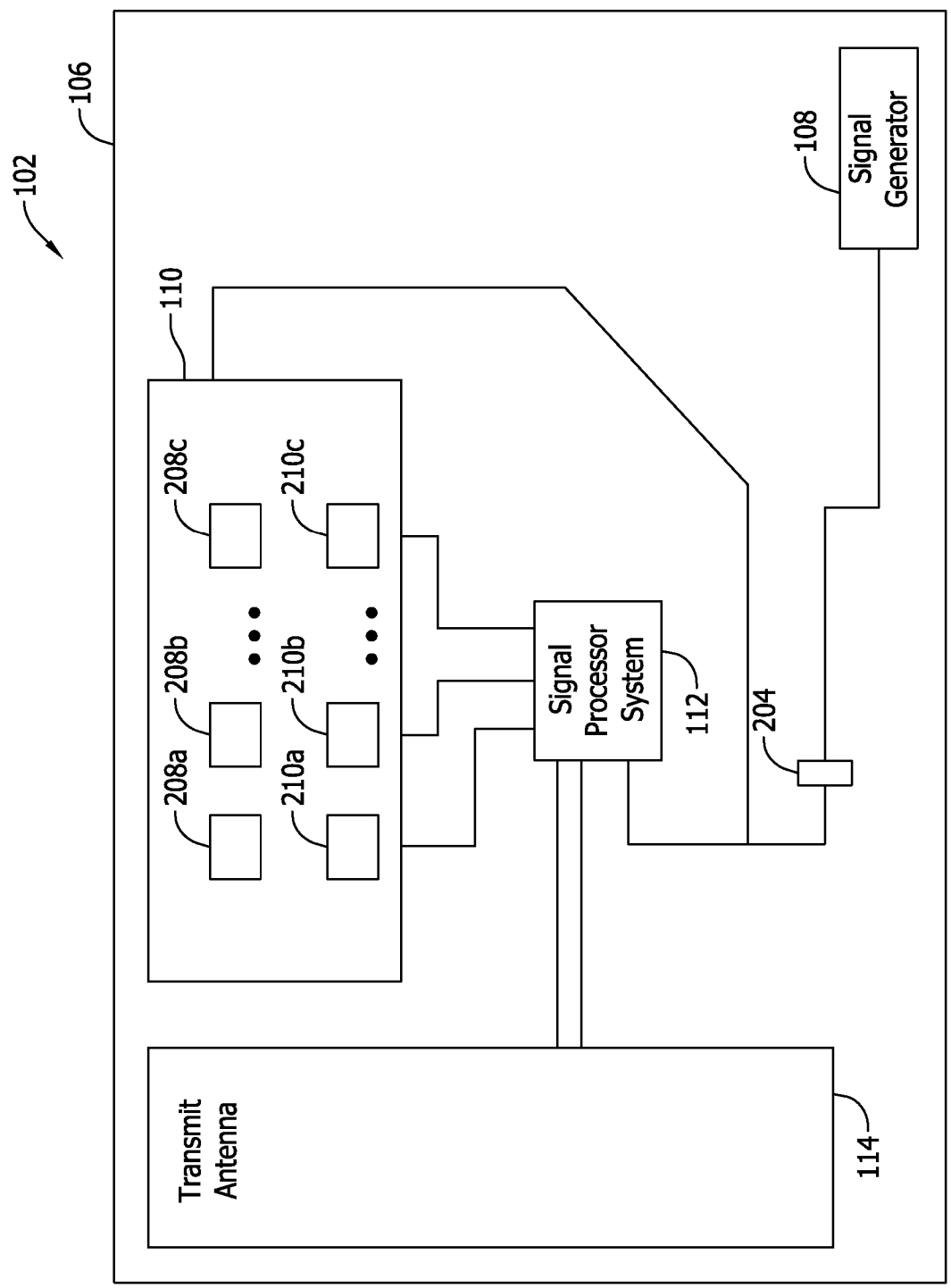
FIG. 3 is a schematic view of the example sensing and transmit subsystem shown in FIG. 1 and FIG. 2.

FIG. 3 is a schematic view of sensing and transmit subsystem 102 (shown in FIGS. 1 and 2). As shown and discussed herein, sensing and transmit subsystem 102 may be attached on a flexible or FHE substrate to accommodate placement of sensing and transmit subsystem 102 between closely spaced component parts of an assembled structure, such as between component parts of an assembled airframe structure. Accordingly, one technical effect of sensing and transmit subsystem 102 is that at least a portion of sensing and transmit subsystem 102 may be flexibly placed or mounted between closely spaced component parts to measure an air gap between the component parts.

Accordingly, and as described in additional detail below, signal processor system 112 may calculate a gap distance measured by capacitor sensor array 202 with a known capacitance of reference capacitor 204, an input voltage provided by signal generator 108 to capacitor sensor array 202, and an output voltage of capacitor sensor array 202.

More particularly, Equation 1 below may be used to calculate the gap distance, where $C_1$ is the known capacitance of reference capacitor 204, $C_2$ is a capacitance of a selected capacitor sensor 208a-208c, $V_i$ is the input voltage supplied by signal generator 108, $V_o$ is the output voltage of capacitor sensor array 202, and d is the average gap distance across some area:

$$\frac{V_o}{V_i} = \frac{\frac{1}{C2}}{\frac{1}{C1} + \frac{1}{C2}} \cong \frac{d}{\frac{1}{C1} + d}, \text{ where } C_2 \alpha \frac{1}{d} \quad \text{Equation 1}$$

Specifically, signal processor system 112 may solve or calculate from the equation above, a gap distance, d, using known or measured values for $V_o$, $V_i$, and $C_1$, which it will be appreciated, may be rearranged for the variable, d.

Figure 4:
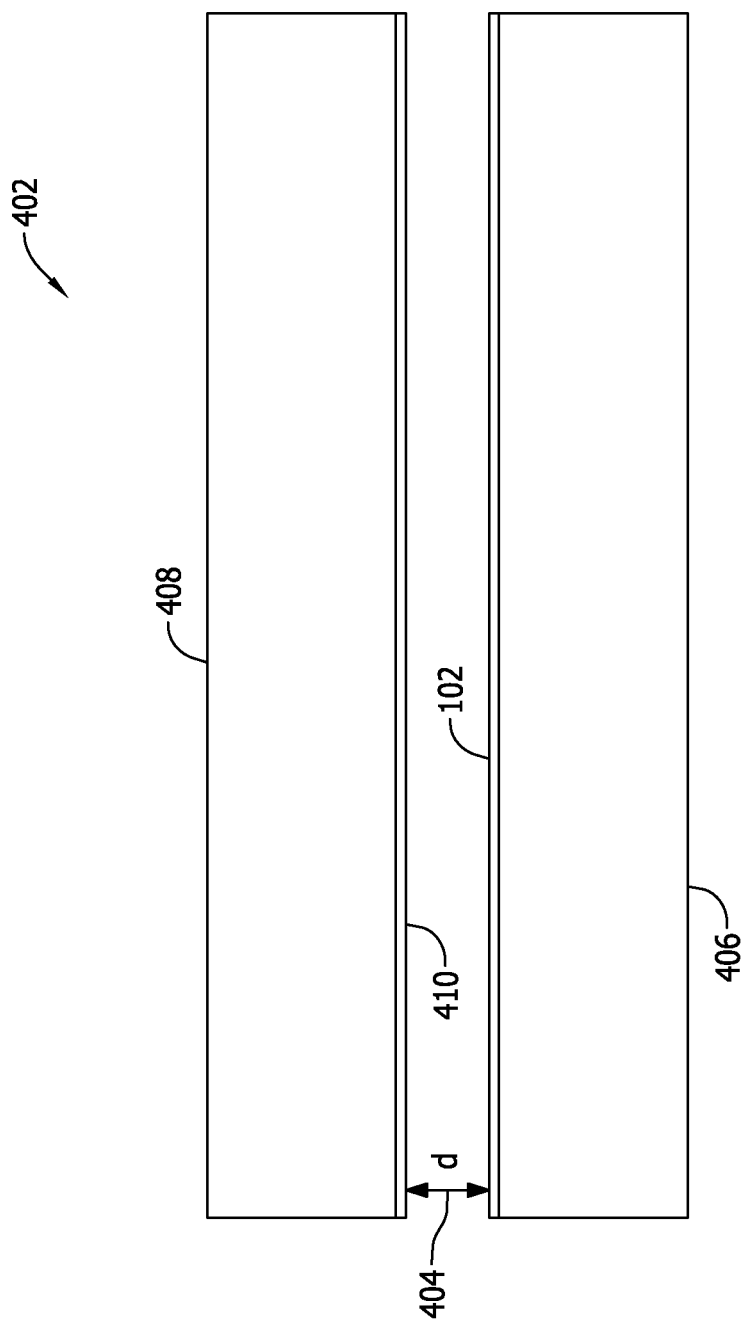
FIG. 4 is a cross-sectional view of an example assembled mechanical structure that includes a gap between a first component part of the mechanical structure and a second component part of the mechanical structure, and in which the sensing and transmit subsystem of the system shown at FIGS. 1-3 is mounted within the gap.
Figure 5:
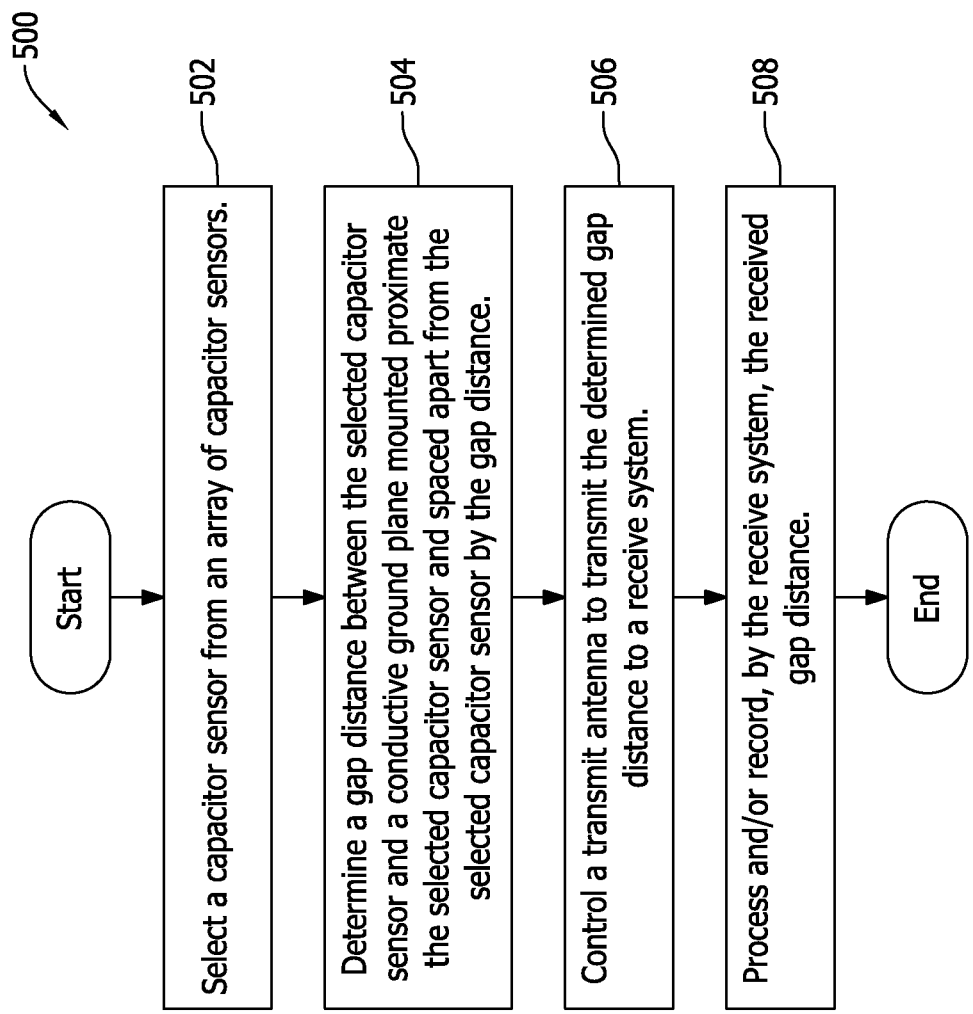
FIG. 5 is a flowchart illustrating an example process for measuring a gap distance of the gap shown at FIG. 4 using the system shown in FIGS. 1-3.

FIG. 4 is a cross-sectional view of an example assembled mechanical structure 402 that includes a gap 404 having a gap distance, d, between a first component part 406 and a second component part 408, and in which at least a portion of the sensing and transmit subsystem 102 is removably mounted or installed within gap 404. FIG. 5 is a flowchart illustrating an example process 500 for measuring a gap distance of gap 404 using system 100.

Accordingly, in operation and with concurrent reference to FIGS. 4 and 5, at least a portion of sensing and transmit subsystem 102 may be mounted (e.g., using an adhesive coating of substrate 106) on a surface of a component part, such as a surface of first component part 406, as shown. In particular, at least a portion of sensing and transmit subsystem 102 may be removably mounted on a surface of component part 406 within gap 404 to measure one or more gap distances within gap 404.

At the same time, a conductive ground plane 410 may be removably mounted on an opposing surface of second component part 408. In various embodiments, conductive ground plane 410 may include any suitable conductive layer of material, such as a thin layer of copper or aluminum. Further, in some embodiments, an area of conductive ground plane 410 may substantially match an area of sensing and transmit subsystem 102 and/or an area of gap measurement sensor 110 and/or capacitor sensor array 202. One technical effect of conductive ground plane 410 is, as described herein, that conductive ground plane 410 facilitates measurement and collection of one or more gap distance measurements.

Once sensing and transmit subsystem 102 is correctly positioned (e.g., by a technician or operator) within gap 404, the technician may operate receive subsystem 104 to induce an electromagnetic field in transmit antenna 114 and thereby supply electrical power to sensing and transmit subsystem 102. As described above, in some embodiments, receive subsystem 104 does not power sensing and transmit subsystem 102, such as, for example, in the case that sensing and transmit subsystem 102 is self-powered (e.g., by an internal battery source).

To determine one or more gap distances, signal processor system 112 may select one or more capacitor sensors 208a-208c by turning on or off one or more switches 210a-210c, such as, for example, by supplying a bias voltage to switches 210a-210c (step 502). In this regard, signal processor system 112 may also be thought of as switching one or more capacitor sensors 208a-208c on or off, in that a switch 210a-210c connected to each capacitor sensor 208a-208c may be switched on or off to control selection of the respective switching element 208a-208c.

Simultaneously, signal generator 108 may supply an AC input voltage, $V_i$, to each capacitor sensor 208a-208c of gap measurement sensor 110. As capacitor sensors 208a-208c are charged by the AC input voltage, a capacitance, $C_2$, is established between each capacitor sensor 208a-208c and conductive ground plane 410, and an output voltage, $V_o$, can be measured or received by signal processor system 112 from each capacitor sensor 208a-208c.

More particularly, when a switch 210a-210c is turned on, an output voltage, $V_o$, from a corresponding capacitor sensor 208a-208c can be measured or received by signal processor system 112. Once received, the output voltage may be used, in conjunction with Equation 1 above, to determine a gap distance, d, associated with gap 404 between the respective capacitor sensor 208a-208c and conductive ground plane 410, where, as described above, conductive ground plane 410 is mounted proximate the selected capacitor sensor 208a-208c and spaced apart from the selected capacitor sensor 208a-208c by the gap distance, d (step 504).

To construct a gap profile, signal processor system 112 may, in addition, sequentially turn on and/or off each switch 210a-210c, such that a gap distance measurement is obtained from each switch 210a-210c. In addition, once a gap profile has been obtained for a region or area covered by gap measurement sensor 110, sensing and transmit subsystem 102 may be moved (e.g., by the technician) to a next region within gap 404, and this process of data collection and incrementally moving gap sensing and transmit subsystem 102 may continue until an entire (or partial) gap profile is complete. In a related embodiment, at least a portion of a plurality of sensing and transmit subsystems 102 may be mounted within an air gap, such each sensing and transmit subsystem 102 measures gap distances of only a portion of an air gap, and such that the air gap measurements collected by each sensing and transmit subsystem 102 are provided to receive subsystem 104 and compiled to determine a complete gap profile.

In some embodiments (e.g., where capacitor sensors 208a-208c are not all the same size), signal processor system 112 may select a capacitor sensor 208a-208c based, roughly, upon a gap distance to be measured. For example, capacitor sensor 208a may be best sized to measure gap distances in the range of 5 to 10 mils, while capacitor sensor 208b may be best sized to measure gap distances in the range of 10 to 20 mils, and capacitor sensor 208c may be best sized to measure gap distances in the range of 20 to 30 mils. Thus, in at least some embodiments, signal processor system 112 may turn on a capacitor sensor 208a-208c based upon a size range of a gap to be measured, such that a capacitor sensor 208a-208c best suited to measuring in the range is selected.

During the measurement and collection phase described above, signal processor system 112 may simultaneously and/or periodically control transmit antenna 114 to transmit each gap distance to receive subsystem 104 (step 506).

Receive subsystem 104 may receive, display, and/or store each gap distance measurement (step 508) and, in addition, may provide each gap distance measurement to a production tool, such as a CNC machine, for manufacture of a shim to fit the gap profile of gap 404.

Thus, a system for remote sensing of air gaps is described. The system includes a sensing and transmit subsystem and a receive subsystem. In at least one example embodiment, the sensing and transmit subsystem includes, among other components, a signal processor system, a transmit antenna, and a capacitor sensor array having a plurality of capacitor sensors. Likewise, the receive subsystem includes a receive antenna and another signal processor system.

During operation, at least a portion of the sensing and transmit subsystem is mounted within an air gap between two component parts of a larger mechanical structure, and the signal processor system of the sensing and transmit subsystem controls the capacitor sensor array to measure one or more gap distances of the air gap. The signal processor system of the sensing and transmit subsystem also controls the transmit antenna to transmit one or more air gap measurements to the receive antenna of the receive subsystem, whereupon the receive subsystem processes the received air gap measurements to control a production tool to manufacture a shim sized to fit within and fill the air gap.

The systems and methods described herein are not limited to the specific embodiments described herein, but rather, components of the systems and/or steps of the methods may be utilized independently and separately from other components and/or steps described herein.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

As used herein, an element or step recited in the singular and proceeded with the word "a" or "an" should be understood as not excluding plural elements or steps unless such exclusion is explicitly recited. Furthermore, references to "one embodiment" of the present disclosure or "an example embodiment" are not intended to be interpreted as excluding the existence of additional embodiments that also incorporate the recited features.

This written description uses examples to disclose various embodiments, which include the best mode, to enable any person skilled in the art to practice those embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A system for remote sensing of air gaps, the system comprising:
   a flexible hybrid electronic (FHE) substrate;
   a capacitor sensor array attached to the FHE substrate, the capacitor sensor array comprising a plurality of capacitor sensors configured to measure an air gap;
   a transmit antenna attached to the FHE substrate;
   a microprocessor attached to the FHE substrate and electrically connected to the transmit antenna and the capacitor sensor array, wherein the microprocessor is configured to switch on and off at least one capacitor sensor of the plurality of capacitor sensors, and wherein the microprocessor is further configured to process and transmit determined air gap measurements using the transmit antenna;
   a printed circuit disposed on the FHE substrate and electrically coupling the capacitor sensor array, the transmit antenna, and the microprocessor;
   an alternating current (AC) signal generator attached to the FHE substrate; and
   a reference capacitor electrically connected to the AC signal generator and the capacitor sensor array, wherein the reference capacitor is a capacitor having a tunable capacitance, and wherein, the reference capacitor is mechanically or electrically tunable based upon a size of an air gap to be measured.

2. The system of claim 1, wherein the FHE substrate is a polyimide film substrate.

3. The system of claim 1, further comprising:
   a receive antenna configured to receive, from the transmit antenna, the determined air gap measurements; and
   a receive microprocessor electrically connected to the receive antenna, the receive microprocessor configured to process the determined air gap measurements received by the receive antenna.

4. The system of claim 1, wherein the FHE substrate, including the capacitor sensor array, is configured to be removably mounted on a first component part of a structure that includes an air gap, the system further comprising a ground plane configured to be removably mounted on a second component part of the structure, wherein the first component part and the second component part define the air gap therebetween.

5. The system of claim 1, wherein at least some of the plurality of capacitor sensors included in the capacitor sensor array are different sizes, and wherein the microprocessor is configured to select at least one capacitor sensor of the plurality of capacitor sensors based upon and corresponding to a size of an air gap to be measured.

6. The system of claim 1, wherein each capacitor sensor of the plurality of capacitor sensors included in the capacitor sensor array are a same size, and wherein the microprocessor is configured to sequentially select at least some capacitor sensors of the plurality of capacitor sensors to determine a physical profile of an air gap to be measured.

7. The system of claim 1, wherein the microprocessor is powered by the transmit antenna.

8. The system of claim 1, wherein the microprocessor is further configured to switch on and off the plurality of capacitor sensors in a sequence to create a gap profile.

9. A system for remote sensing of air gaps, the system comprising:
   a flexible hybrid electronics (FHE) substrate;
   a signal generator attached to the FHE substrate;
   a capacitor sensor array attached to the FHE substrate, the capacitor sensor array comprising a plurality of capacitor sensors;
   a reference capacitor attached to the FHE substrate and electrically connected between the signal generator and the capacitor sensor array, wherein the reference capacitor is mechanically or electrically tunable based upon a size of an air gap to be measured;
   a plurality of switching elements attached to the FHE substrate, at least one switching element of the plurality of switching elements electrically connected to a respective capacitor sensor of the plurality of capacitor sensors; and a printed circuit disposed on the FHE substrate and electrically coupling the signal generator, the capacitor sensor array, the reference capacitor, and the plurality of switching elements.

10. The system of claim 9, further comprising a microprocessor attached to the FHE substrate, the microprocessor configured to:
   select a capacitor sensor of the plurality of capacitor sensors by turning on a respective switching element; and
   determine a gap distance between the selected capacitor sensor and a conductive ground plane mounted proximate the selected capacitor sensor and spaced apart from the selected capacitor sensor by the gap distance.

11. The system of claim 10, wherein the microprocessor is further configured to determine the gap distance based, at least, upon a capacitance of the reference capacitor, an input voltage supplied by the signal generator, and an output voltage of the selected capacitor sensor.

12. The system of claim 9, further comprising a rectifier attached to the FHE substrate.

13. The system of claim 9, wherein the FHE substrate is a polyimide film substrate.

14. The system of claim 9, further comprising a transmit antenna attached to the FHE substrate.

15. The system of claim 9, further comprising:
   a receive antenna configured to receive, from a transmit antenna attached to the FHE substrate, a determined gap distance; and
   a receive microprocessor electrically connected to the receive antenna, the receive microprocessor configured to process the determined gap distance.

16. A method for remote sensing of air gaps, the method comprising:
   selecting, by a microprocessor attached to a flexible hybrid electronics (FHE) substrate, a capacitor sensor from an array of capacitor sensors attached to the FHE substrate, wherein a printed circuit disposed on the FHE substrate electrically couples the microprocessor and the array of capacitor sensors;
   tuning a reference capacitor electrically coupled to the capacitor sensor for a size of an air gap to be measured;
   determining, by the microprocessor, a gap distance between the selected capacitor sensor and a conductive ground plane mounted proximate the selected capacitor sensor and spaced apart from the selected capacitor sensor by the gap distance; and
   controlling, by the microprocessor, a transmit antenna attached to the FHE substrate to transmit the determined gap distance to a receive subsystem.

17. The method of claim 16, further comprising:
   receiving, by the receive subsystem and from the transmit antenna, the determined gap distance; and
   processing, by the receive subsystem, the determined gap distance.

18. The method of claim 16, wherein at least some capacitor sensors included in the array of capacitor sensors are different sizes, the method further comprising selecting, by the microprocessor, at least one capacitor sensor based upon and corresponding to a size of an air gap to be measured.

19. The method of claim 16, wherein each capacitor sensor included in the array of capacitor sensors is a same size, the method further comprising sequentially selecting, by the microprocessor, at least some capacitor sensors to determine a physical profile of an air gap to be measured.

20. The method of claim 16, further comprising powering the microprocessor by the transmit antenna.

* * * * *